United States Patent
Sheashua et al.

(10) Patent No.: US 10,536,914 B2
(45) Date of Patent: Jan. 14, 2020

(54) SYNCHRONIZING A 5G COMMUNICATION CHANNEL USING A 4G TIMING SYNCHRONIZATION PARAMETER

(71) Applicant: QUALCOMM INCORPORATED, San Diego, CA (US)

(72) Inventors: Ronen Sheashua, Petach Tikva (IL); Assaf Touboul, Netanya (IL); Serguei Glazko, San Diego, CA (US); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 15/592,260

(22) Filed: May 11, 2017

(65) Prior Publication Data

US 2018/0084513 A1 Mar. 22, 2018

Related U.S. Application Data

(60) Provisional application No. 62/398,186, filed on Sep. 22, 2016.

(51) Int. Cl.
*H04W 56/00* (2009.01)

(52) U.S. Cl.
CPC ... *H04W 56/0015* (2013.01); *H04W 56/0035* (2013.01)

(58) Field of Classification Search
CPC ............. H04W 56/0015; H04W 56/00; H04W 56/0035
See application file for complete search history.

(56) References Cited

U.S. PATENT DOCUMENTS

| | | | | |
|---|---|---|---|---|
| 9,084,260 | B2* | 7/2015 | Maltsev | H04W 72/0453 |
| 9,491,632 | B2* | 11/2016 | Sadek | H04W 72/1215 |
| 9,893,758 | B2* | 2/2018 | HomChaudhuri | H04W 76/38 |
| 10,098,038 | B2* | 10/2018 | Wen | H04W 4/80 |
| 10,313,889 | B2* | 6/2019 | Wei | H04W 16/14 |
| 2006/0247874 | A1* | 11/2006 | Premerlani | G01R 19/2513 |
| | | | | 702/64 |
| 2007/0275746 | A1* | 11/2007 | Bitran | H04W 16/14 |
| | | | | 455/509 |
| 2012/0243638 | A1* | 9/2012 | Maltsev | H04W 72/0453 |
| | | | | 375/316 |
| 2013/0272260 | A1* | 10/2013 | Bitran | H04W 76/10 |
| | | | | 370/329 |
| 2014/0099950 | A1* | 4/2014 | Mildh | H04W 56/001 |
| | | | | 455/434 |

(Continued)

FOREIGN PATENT DOCUMENTS

| | | |
|---|---|---|
| CN | 103744284 B | 4/2016 |
| WO | 2016138664 A1 | 9/2016 |

OTHER PUBLICATIONS

International Search Report and Written Opinion—PCT/US2017/047876—ISA/EPO—dated Nov. 16, 2017 (165522WO).

*Primary Examiner* — Tejis Daya
(74) *Attorney, Agent, or Firm* — Smith Tempel Blaha LLC

(57) ABSTRACT

A method for clock synchronization in a communication system having first circuitry coupled to a first communication channel and second circuitry, includes generating a first timing synchronization parameter, and synchronizing the second circuitry to a second communication channel using the first timing synchronization parameter.

9 Claims, 16 Drawing Sheets

(56) References Cited

U.S. PATENT DOCUMENTS

| | | | |
|---|---|---|---|
| 2015/0372851 A1* | 12/2015 | Kakishima | H04W 56/00 |
| | | | 370/329 |
| 2016/0020876 A1 | 1/2016 | Raghavan et al. | |
| 2017/0257774 A1* | 9/2017 | Ghosh | H04W 16/14 |
| 2018/0014247 A1* | 1/2018 | Chandramouli | H04W 48/16 |
| 2018/0249400 A1* | 8/2018 | Harada | H04W 48/18 |

* cited by examiner

SYNCHRONIZING A 5G COMMUNICATION CHANNEL USING A 4G TIMING SYNCHRONIZATION PARAMETER

RELATED APPLICATIONS

This application claims the benefit of U.S. Provisional Patent Application No. 62/398,186, entitled "Synchronizing 5G Communication Channel Using 4G Synchronization Parameter," filed Sep. 22, 2016, the contents of which are hereby incorporated by reference in their entirety.

FIELD

The present disclosure relates to wireless communication systems, and more particularly to timing synchronization in wireless communications.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). UEs may locate a base station by detecting synchronization signal(s) from which the UEs acquire the base station identification code (cell ID), system timing information, frame alignment information, etc. In systems where the receiver is highly signal strength and noise limited (e.g., millimeter wave systems), beamformed synchronization signals may be swept across the cell coverage area to provide coverage enhancement to improve detection.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for clock synchronization in a communication system having first circuitry coupled to a first communication channel and second circuitry, the method including generating a first timing synchronization parameter, and synchronizing the second circuitry to a second communication channel using the first timing synchronization parameter.

Another aspect of the disclosure provides an apparatus for clock synchronization in a communication system including first circuitry coupled to a first communication channel, second circuitry, and a first timing synchronization parameter configured to allow the second circuitry to establish communication with a second communication channel.

Another aspect of the disclosure provides a device including means for coupling first circuitry to a first communication channel, means for generating a first timing synchronization parameter, and means for synchronizing second circuitry to a second communication channel using the first timing synchronization parameter.

Another aspect of the disclosure provides a non-transitory computer-readable medium storing computer executable code for clock synchronization in a communication system having first circuitry coupled to a first communication channel and second circuitry, the code executable by a processor to generate a first timing synchronization parameter, and synchronize the second circuitry to a second communication channel using the first timing synchronization parameter.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

In a communication system having UEs that may simultaneously support both 4G and 5G communication, it is possible that a UE may be operatively coupled to a base station using 4G transmissions, but it may also be desirable for the UE to couple to the base station to support 5G connectivity. When coupling to a base station, a UE observes synchronization signals that allow the UE to establish proper timing and clocking of the transmission signals in order to establish a communication channel with the base station. For example, in a UE having dual connectivity capability including the ability to establish a 4G communication channel and a 5G communication channel, a UE may be coupled to a base station using 4G connectivity, but may also wish to couple to the base station using 5G connectivity. Therefore, it may be advantageous to leverage at least some of the 4G connectivity and timing synchronization parameters to allow the UE to efficiently establish 5G connectivity.

Exemplary embodiments of the disclosure are directed to synchronization signals used to establish wireless communication device connectivity and elements thereof, for example using an existing 4G synchronization signal to establish a clock and timing reference signal to allow the efficient establishment of 5G device connectivity.

Figure 1:
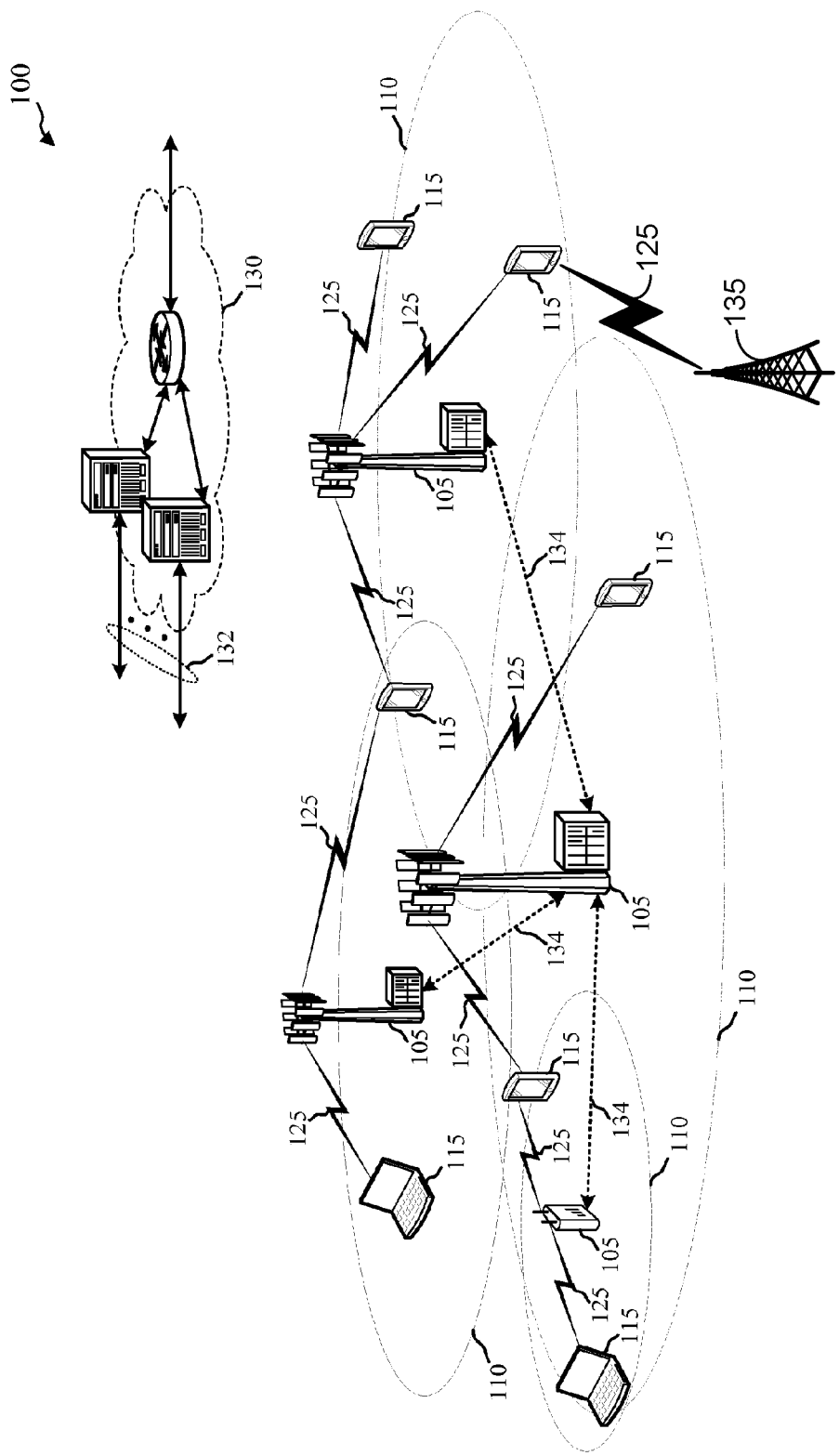
FIG. 1 is a diagram showing a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through a first set of backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over a second set of backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a gNodeB (gNB), a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 may be one or more of an LTE/LTE-A network and a 5G network. In LTE/LTE-A networks, the term evolved Node B (eNB) may be generally used to describe the base stations 105, while the term UE may be generally used to describe the UEs 115. In contrast, in 5G or New Radio (NR) networks, base stations 105 may be referred to as gNBs. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In some examples, the wireless communications system 100 may be, or may include a millimeter wave communication network.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs/gNBs, small cell eNBs/gNBs, relay base stations, and the like. A UE 115 may also be able to communicate with other UEs either within or outside the same coverage area of a base station via D2D communications.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. In an exemplary embodiment, the communication links 125 may comprise one or more of an LTE communication link and a millimeter wave (mmW) communication link.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support directional synchronization signal for millimeter wave detection and synchronization. For example, a millimeter wave base station 105 may transmit a directional synchronization signal in a sweeping pattern to UEs 115 within its coverage area 110. The base station 105 may configure a narrowband signal of the synchronization signal to convey correlation information, such as location information (e.g., based on cell ID information included or conveyed in the narrowband signal), for a wideband signal of the synchronization signal. Hereinafter, information regarding the properties of the wideband signal may be referred to as "correlation information". The base station 105 may link the wideband signal to the location of the narrowband signal. In some examples, the identification information of the base station 105 may be included or conveyed in the narrowband signal. The identification information may convey the location information, e.g., the UE 115 may perform a function based on the base station 105 identification number and/or access a lookup table. The base station 105 may send the wideband signal component of the synchronization signal according to the correlation information in the narrowband signal.

A UE 115 may receive the narrowband signal of the synchronization signal for the millimeter wave communication network and determine the correlation information associated with the wideband signal from the narrowband signal. For example, the UE 115 may identify the base station 105 sending the narrowband signal, may determine the base station 105 identity based on the frequency of the narrowband signal, etc., to determine the correlation information. The UE 115 may use the correlation information to identify and receive the wideband signal. In some examples, the UE 115 may determine timing information based on the narrowband signal and/or the wideband signal components of the synchronization signal, e.g., system timing, frame boundary/length timing, etc.

In an aspect, the UE 115 is capable of communicating signals via the LTE network and an mmW system (e.g., as a part of a 5G/NR system). Accordingly, the UE 115 may communicate with the base station 105 over a LTE link. Additionally, the UE 115 may communicate with a connection point (CP), a base station (BS) (capable of mmW system communication), or a millimeter wave base station (mmW-BS) 135 over an mmW link.

In a further aspect, at least one of the base stations 105 may be capable of communicating signals via the LTE network and the mmW system over one or more communication links 125. As such, a base station 135 may be referred to as a LTE+mmW eNB or gNB or as a LTE+mmW CP/BS/mmW-BS.

In an exemplary embodiment, a UE may be operatively coupled to a base station over an LTE/LTE-A communication channel, which may also be referred to as a 4G communication channel. The UE may also be capable of communication using what is referred to as 5G connectivity. In an exemplary embodiment, a 5G communication channel may use mmW access frequencies, on the order of 28 GHz (Gigahertz).

When developed by a low cost frequency source, such as a low cost oscillator having, for example, a 20 part per million (ppm) accuracy over expected temperature variations, a frequency offset may occur at the mmW access frequencies that may be on the order of ten times greater than the frequency offset developed by an oscillator operating at LTE frequencies, on the order of 3 GHz.

In an exemplary embodiment, before establishing a mmW (5G) communication link, a UE may connect to a 4G (LTE) base station and may use at least one 4G timing parameter or synchronization parameter, such as, for example, a 4G frequency reference, to allow the 5G oscillator either to be set accurately to a reference frequency (for example, the 4G frequency reference) or have a negligible frequency offset with respect to the frequency of the 4G frequency reference (i.e., have a negligible frequency offset compared to the frequency inaccuracy that the UE can tolerate without impacting communication quality). Alternatively, the frequency offset of the 5G oscillator may be estimated and the initial frequency established using the frequency of the 4G frequency reference based on the 4G (LTE) connection with the base station. Thus, the effective frequency offset of the 5G oscillator will be significantly reduced from the initial exemplary 20 ppm and appear as an oscillator in a 4G communication device, i.e., an oscillator having a lower frequency offset, for example, a frequency offset on the order of an oscillator having a 20 ppm accuracy operating at 3 GHz. Further, in an exemplary embodiment, a modem in a 5G communication device can learn the temperature dependency of the low cost frequency source used in the 5G oscillator over time and may therefore only rely on the 4G synchronization parameter during an initial learning phase.

Therefore, in a UE capable of both 4G and 5G connectivity, it would be desirable to use one or more of the 4G synchronization parameters, such as a timing reference signal, a synchronization signal, or another 4G timing reference signal, as a starting point for setting a 5G frequency reference for establishing 5G connectivity. For example, various embodiments described herein allow the use of a 4G clock signal, or other 4G timing or synchronization signal, to be used as a beginning reference point for establishing 5G synchronization between a UE and a network.

Figure 2:
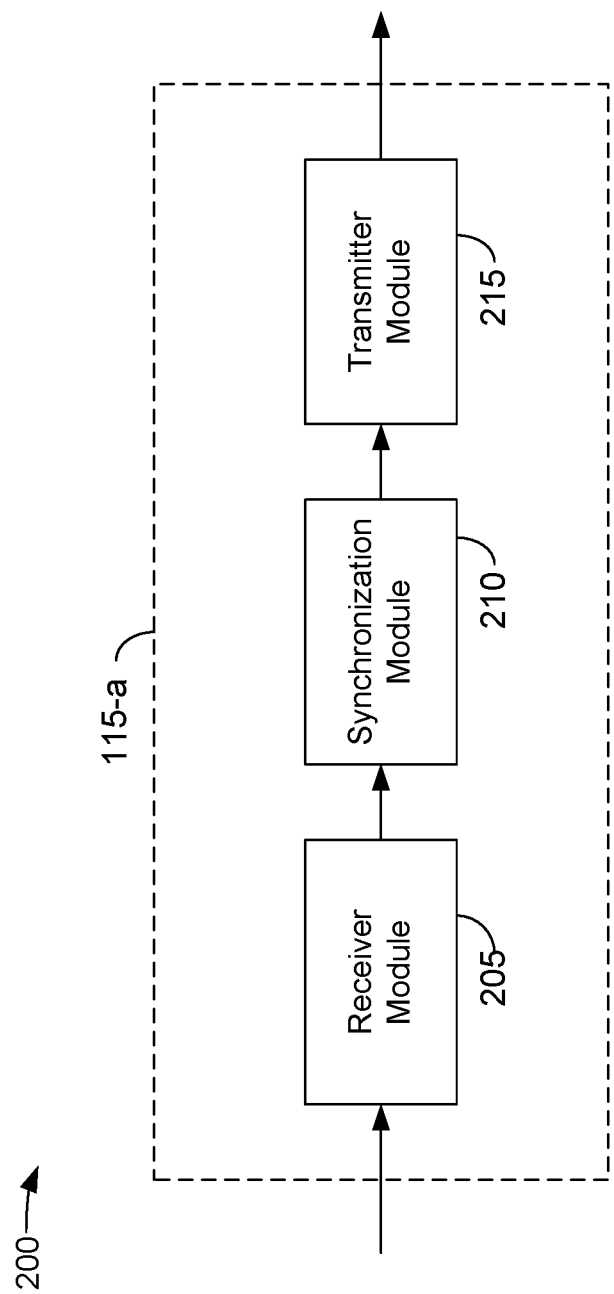
FIG. 2 is a block diagram showing a device configured for use in wireless communication, in accordance with various aspects of the present disclosure.

FIG. 2 is a block diagram 200 of a device 115-a for use in wireless communication, in accordance with various aspects of the present disclosure. The device 115-a may be an example of one or more aspects of a UE 115 described with reference to FIG. 1. The device 115-a may include a receiver module 205, a synchronization module 210, and/or a transmitter module 215. The device 115-a may also be or include a processor (not shown). Each of these modules may be in communication with each other.

The components of the device 115-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 205 may receive information such as packets, user data, and/or control information associated with various information channels (e.g., control channels, data channels, etc.). The receiver module 205 may receive messages from a millimeter wave base station 105 including information associated with synchronization signaling. Information may be passed on to the synchronization module 210, and to other components of the device 115-a.

The synchronization module 210 may manage synchronization functions for the device 115-a. The synchronization module 210 may receive, via the receiver module 205, a synchronization signal associated with 4G connectivity. For example, the synchronization module 210 may receive a 1 PPS (1 pulse per second) network reference synchronization signal for 4G circuitry associated with the device 115-a. Alternatively, a clock signal, a frequency reference signal, a frequency offset signal, or other clock and/or timing synchronization signal, that may be internal to the 4G circuitry on the device 115-a may be provided to 5G circuitry of the device 115-a to allow the device 115-a to efficiently achieve 5G synchronization using the 4G clock signal or other 4G synchronization signal.

The transmitter module 215 may transmit the one or more signals received from other components of the device 115-a. The transmitter module 215 may transmit information such as packets, user data, and/or control information to a serving cell. The transmitter module 215 may send messages to a millimeter wave base station 105 in conjunction with various synchronization signaling operations, e.g., random access procedures. In some examples, the transmitter module 215 may be collocated with the receiver module 205 in a transceiver module.

Figure 3:
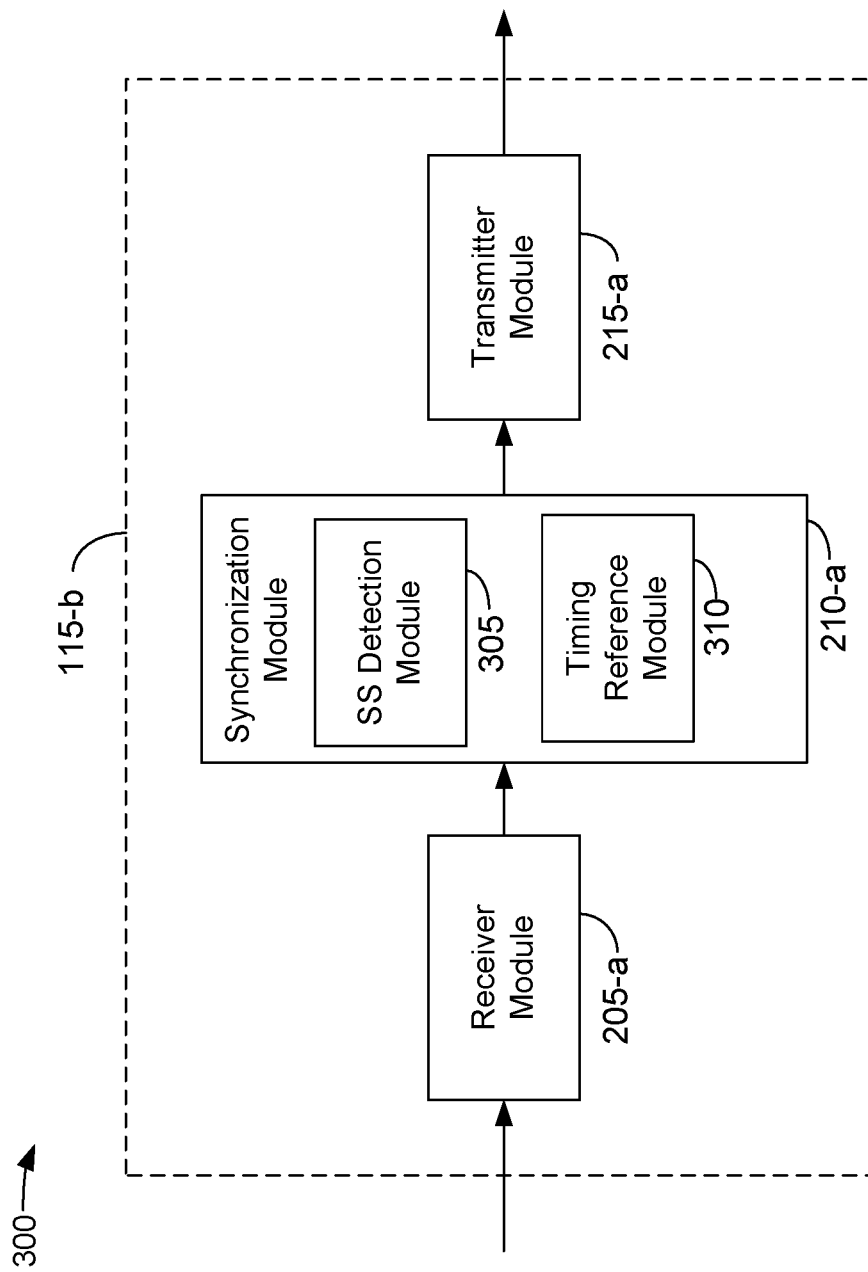
FIG. 3 is a block diagram showing a device configured for use in wireless communication, in accordance with various aspects of the present disclosure.

FIG. 3 is a block diagram 300 of a device 115-b for use in wireless communication, in accordance with various examples. The device 115-b may be an example of one or more aspects of a UE 115 described with reference to FIG. 1. It may also be an example of a device 115-a described with reference to FIG. 2. The device 115-b may include a receiver module 205-a, a synchronization module 210-a, and/or a transmitter module 215-a, which may be examples of the corresponding modules of device 115-a. The device 115-b may also include a processor (not shown). Each of these components may be in communication with each other. The synchronization module 210-a may include a timing reference module 310. The receiver module 205-a and the transmitter module 215-a may perform the functions of the receiver module 205 and the transmitter module 215, of FIG. 2, respectively.

The components of the device 115-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The synchronization signal detection module 305 may manage aspects of synchronization signal detection and management for the device 115-b. The synchronization signal detection module 305 may, in cooperation with the receiver module 205-a and/or the transmitter module 215-a, receive a synchronization signal from a communication network or from a base station 105 coupled to a communication network for millimeter wave communications.

In an exemplary embodiment, the synchronization signal detection module 305 may detect a synchronization signal associated with a 4G communication network, and may forward the 4G synchronization signal to the timing reference module 310. In exemplary embodiments, the synchronization signal associated with a 4G communication network may comprise one or more of a 4G clock signal from which a 1 PPS synchronization signal may be generated and provided to 5G circuitry (not shown), a 4G clock signal that may be propagated from 4G circuitry (not shown) to 5G circuitry (not shown) via an internal interface (such as a peripheral component interconnect-express (PCI-E)) interface, an output of a voltage controlled oscillator (VCO) associated with 4G circuitry (not shown) that may be provided to a VCO associated with 5G circuitry (not shown), or 4G circuitry analyzing a 5G clock signal and adjusting the 5G clock signal based on the analysis. Alternatively, the synchronization signal associated with a 4G communication network may be a frequency reference signal, a frequency offset signal, or other clock and/or timing reference signal.

The timing reference module 310 may manage aspects of synchronization reference timing for the device 115-b. For example, the timing reference module 310 may, in cooperation with the synchronization signal detection module 305, determine one or more timing references for the device 115-b. In an exemplary embodiment, the timing reference module 310 may receive a synchronization signal associated with a 4G communication channel and, using the 4G synchronization signal, establish a timing reference for 5G circuitry (not shown) in the device 115-b.

Figure 4:
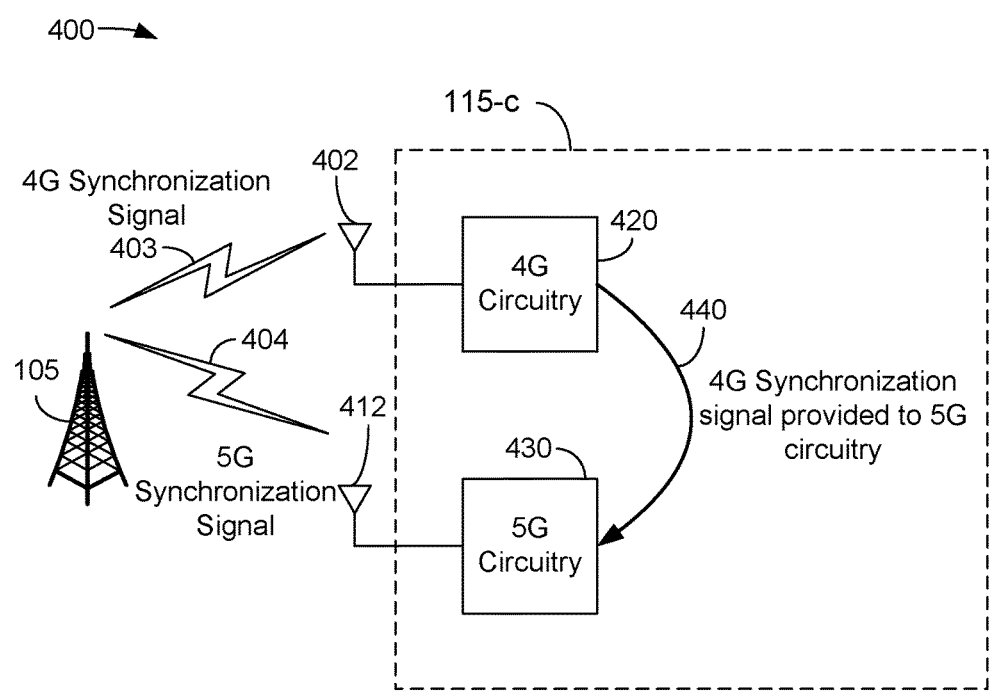
FIG. 4 is a block diagram showing a device configured for use in wireless communication, in accordance with various aspects of the present disclosure.

FIG. 4 is a block diagram 400 of a device 115-c for use in wireless communication, in accordance with various examples. The device 115-c may be an example of one or more aspects of a UE 115 described with reference to FIG. 1. It may also be an example of a device 115-a described with reference to FIG. 2 or an example of a device 115-b described with reference to FIG. 3. The device 115-c may include first circuitry, which in this example, may be 4G circuitry 420 and may include second circuitry, which in this example, may be 5G circuitry 430. The 4G circuitry 420 may be coupled to an antenna 402 and the 5G circuitry 430 may be coupled to an antenna 412. Although shown as single elements, the antenna 402 and the antenna 412 may comprise one or more antenna elements, may comprise an array, or a phased array, of antenna elements, and may comprise one or more directional and/or omni-directional antenna elements.

In an exemplary embodiment, a base station 105 may include capability to establish a 4G communication channel 403 with the 4G circuitry 420 and may include capability to establish a 5G communication channel 404 with the 5G circuitry 430. In an exemplary embodiment, a synchronization signal may be communicated from the base station 105 to the device 115-c via the 4G circuitry 420, for example, as part of a network reference signal. In an exemplary embodiment, the device 115-c may have an established 4G communication channel 403, but may not have an established 5G communication channel 404. In an exemplary embodiment, if the device 115-c has an established 4G communication channel 403 and desires to establish a 5G communication channel 404, the 4G circuitry 420 may be configured to interact with the 5G circuitry 430 to efficiently allow the 5G circuitry 430 to establish a faster acquisition of the 5G communication channel 404 with the base station 105.

In an exemplary embodiment, the 4G circuitry 420 may provide a timing synchronization parameter (e.g., a timing synchronization signal, a frequency reference signal, a frequency offset signal, or another timing and/or reference signal) to the 5G circuitry 430. In an exemplary embodiment, the synchronization parameter may be a 1 PPS timing reference signal. In response, the 5G circuitry may process the 1 PPS signal to generate a timing reference signal (e.g., a control signal) that can be used to allow the 5G circuitry to establish a faster acquisition of the 5G communication channel 404 with the base station 105.

In an exemplary embodiment, the 4G circuitry 420 and the 5G circuitry 430 may communicate over an internal bus or connection, such as a PCI-E internal interface, to allow a counter or register associated with the 4G circuitry 420 to communicate with a counter or register associated with the 5G circuitry 430. In this way, the 5G circuitry 430 can receive clock or timing information from the 4G circuitry 420, which allows the 5G circuitry to establish a faster acquisition of the 5G communication channel 404 with the base station 105.

In an exemplary embodiment, the 5G circuitry 430 may receive clock or timing information from a voltage controlled oscillator (VCO) associated with the 4G circuitry 420. The 5G circuitry 430 may be configured to compare the clock or timing information from the VCO associated with the 4G circuitry 420, and generate a control signal to adjust a VCO associated with the 5G circuitry 430 to establish a faster acquisition of the 5G communication channel 404 with the base station 105.

In an exemplary embodiment, the 4G circuitry 420 may receive clock or timing information from a voltage controlled oscillator (VCO) associated with the 5G circuitry 430. The 4G circuitry 420 may be configured to compare the clock or timing information from the VCO associated with the 5G circuitry 430, and generate a control signal that the 5G circuitry may use to generate a 5G control signal to adjust the VCO associated with the 5G circuitry 430 to establish a faster acquisition of the 5G communication channel 404 with the base station 105.

Figure 5:
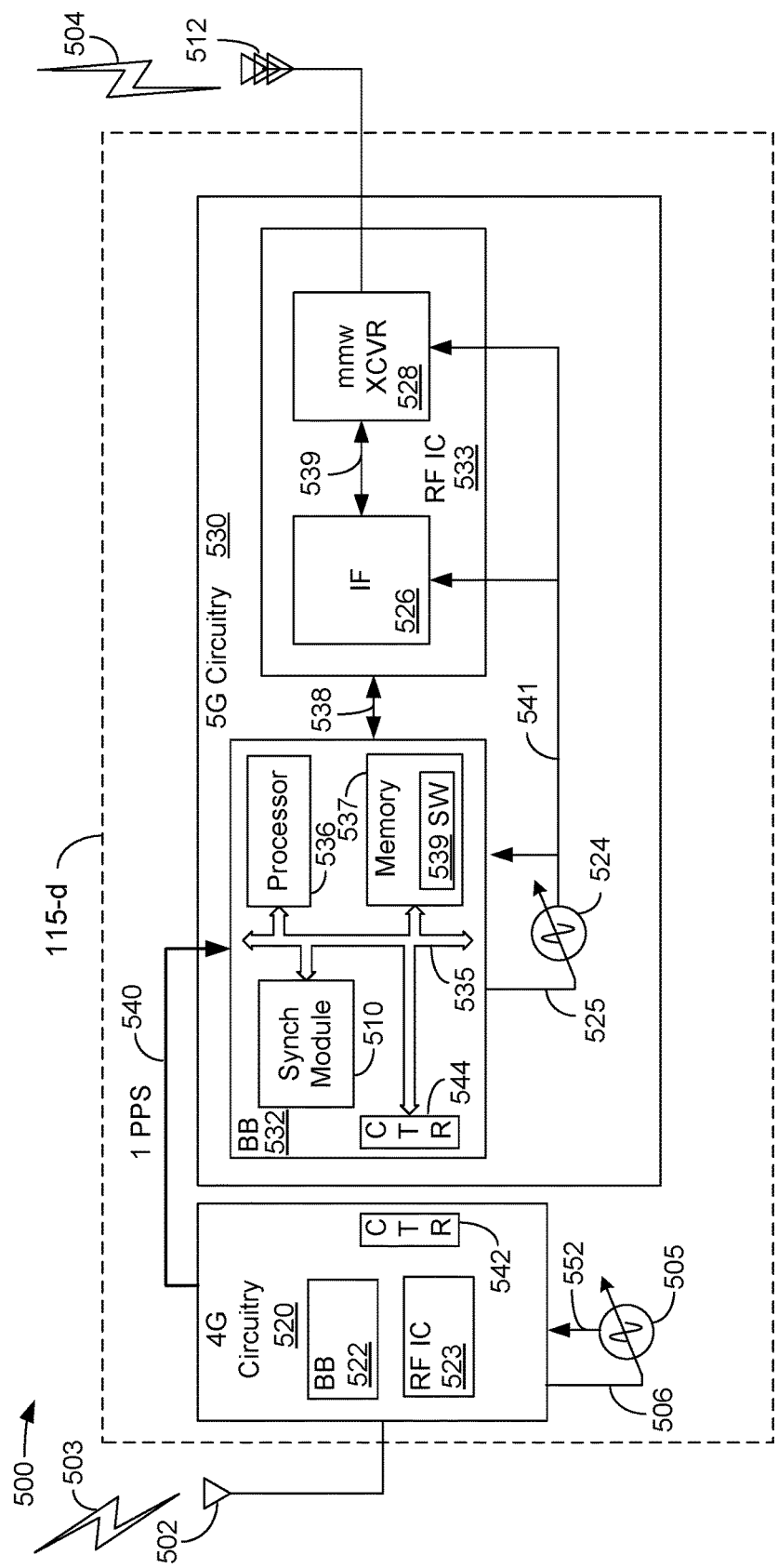
FIG. 5 is a block diagram showing a wireless communication system, in accordance with various aspects of the present disclosure.

FIG. 5 shows a system 500 for use in wireless communication, in accordance with various examples. The system 500 may include a device 115-d, which may be an example of the UE 115 of FIG. 1. The device 115-d may also be an example of one or more aspects of devices 115 of FIGS. 2, 3, and/or 4. The device 115-d may comprise 4G circuitry 520 and 5G circuitry 530. Some of the operational elements of the 4G circuitry 520 and the 5G circuitry 530 may be omitted for ease of description, and are known to those having ordinary skill in the art.

The device 115-d may generally include components for bi-directional voice and data communications including components for transmitting communications and components for receiving communications. The device 115-d may include an antenna 502 coupled to the 4G circuitry 520, and may include an antenna 512 coupled to the 5G circuitry 530. The antenna 512 may comprise one or more antenna elements, may comprise an array, or a phased array, of antenna elements, and may comprise one or more directional and/or omni-directional antenna elements. The 4G circuitry 520 may be configured to establish a 4G communication channel 503 with a base station (not shown) and the 5G circuitry 530 may be configured to establish a 5G communication channel 504 with a base station (not shown).

The 4G circuitry 520 may comprise a baseband system 522 and a radio frequency integrated circuit (RFIC) 523, the details of which are known to those having ordinary skill in the art. The 4G circuitry 520 may be operatively coupled to a voltage controlled oscillator 505 over connection 552. A control signal may be developed by the 4G circuitry 520 and provided to a control input of the VCO 505 over connection 506. The control signal on connection 506 may be used to adjust the output frequency, and other characteristics, of the VCO 505.

The 5G circuitry 530 may comprise a baseband system 532 and a radio frequency integrated circuit (RFIC) 533. The baseband system 532 may comprise a processor 536, a memory 537 (including software (SW) 539), a synchronization module 510 and a counter 544, which each may communicate, directly or indirectly, with each other (e.g., via one or more buses 535). The RFIC 533 may comprise an intermediate frequency (IF) sub-system 526 and a transceiver module 528. In an exemplary embodiment, the transceiver module 528 may be configured to communicate over millimeter wave (mmW) frequencies. The transceiver module 528 may communicate bi-directionally, via the antenna(s) 512 and/or one or more wired or wireless links, with one or more networks, as described above. For example, the transceiver module 528 may communicate bi-directionally with base stations 105 (not shown), with other UEs 115, and/or with devices 115 with reference to FIG. 1, 2, 3, or 4. The transceiver module 528 may include a modem to modulate the packets and provide the modulated packets to the antenna(s) 512 for transmission, and to demodulate packets received from the antenna(s) 512. While the UE 115-d may include a single antenna 512 for the 5G circuitry 530 and a single antenna 502 for the 4G circuitry 520, the UE 115-d may have multiple antennas capable of concurrently transmitting and/or receiving multiple wireless transmissions via carrier aggregation techniques, for example. The transceiver module 528 may be capable of concurrently communicating with one or more base stations 105 via multiple component carriers. Moreover, the 4G circuitry 520 also comprises a transceiver module (not shown) that may also be capable of concurrently communicating with one or more base stations 105 via multiple component carriers.

The 5G circuitry 530 may include a VCO 524 that may be operatively coupled to the baseband system 532, the IF sub-system 526 and the transceiver module 528 over connection 541. A control signal may be developed by the 5G circuitry 530 and provided to a control input of the VCO 524 over connection 525. The control signal on connection 525 may be used to adjust the output frequency, and other characteristics, or parameters of the VCO 524.

The device 115-d may include a synchronization module 510, which may perform the functions described above for the synchronization module 210 of devices 115 of FIGS. 2, 3, and/or 4. In an exemplary embodiment, the 5G circuitry 530 may be configured to receive a synchronization signal from the 4G circuitry 520 over connection 540. In an exemplary embodiment, the synchronization signal on connection 540 may comprise a 1 PPS signal that may be developed by the 4G circuitry as part of the establishment, or the ongoing operation, of a 4G communication channel 503 between the 4G circuitry and the base station 105 (not shown). However, when it is desirable for the device 115-d to establish a 5G communication channel 504 with the base station (not shown) in addition to the 4G communication channel 503, the time duration for establishing the proper timing synchronization for a 5G communication channel 504 may be reduced by using the timing synchronization signal (for example, the 1 PPS signal in this exemplary embodiment), provided by the 4G circuitry 520.

In an exemplary embodiment, the 4G circuitry 520 receives a timing synchronization signal from the network (not shown) and generates a 4G 1 PPS signal on connection 540. The 1 PPS signal on connection 540 is provided to the 5G circuitry 530. In an exemplary embodiment, a counter 542 (CTR) in the 4G circuitry 520 counts the radio frames present in the 1 PPS signal based on the frequency of the VCO 505.

The baseband system 532 in the 5G circuitry 530 receives the 1 PPS signal and also counts the radio frames present in one cycle of the 1 PPS signal, based on the frequency of the VCO 524, and stores the number of radio frames in the counter 544 (CTR). The processor 536 in the baseband system 532 compares the number of radio frames in the counter 542 with the number of radio frames in the counter 544 and uses the result to calculate a frequency offset between the VCO 505 in the 4G circuitry 520 and the VCO 524 in the 5G circuitry 530. The baseband system 532 then uses the frequency offset to develop a control signal over connection 525 to adjust the VCO 524 to synchronize the frequency of the VCO 524 to the frequency of the VCO 505 using the 4G 1 PPS signal. Alternatively, a digital numerically controlled oscillator (DNCO) may be incorporated into the baseband system 532 to generate the control signal.

The memory 537 may include random access memory (RAM) and read-only memory (ROM). The memory 537 may store computer-readable, computer-executable software/firmware code 539 containing instructions that, when executed, cause the processor 536 to perform various functions described herein (e.g., perform synchronization operations, synchronize reference timing parameters, etc.).

Alternatively, the computer-readable, computer-executable software/firmware code 539 may not be directly executable by the processor 536 but cause a computer (e.g., when compiled and executed) to perform functions described herein. The processor 536 may include an intelligent hardware device, e.g., a central processing unit (CPU), a microcontroller, an application-specific integrated circuit (ASIC), etc. In other embodiments, the memory 537 may be on-board the processor 536.

Figure 6:
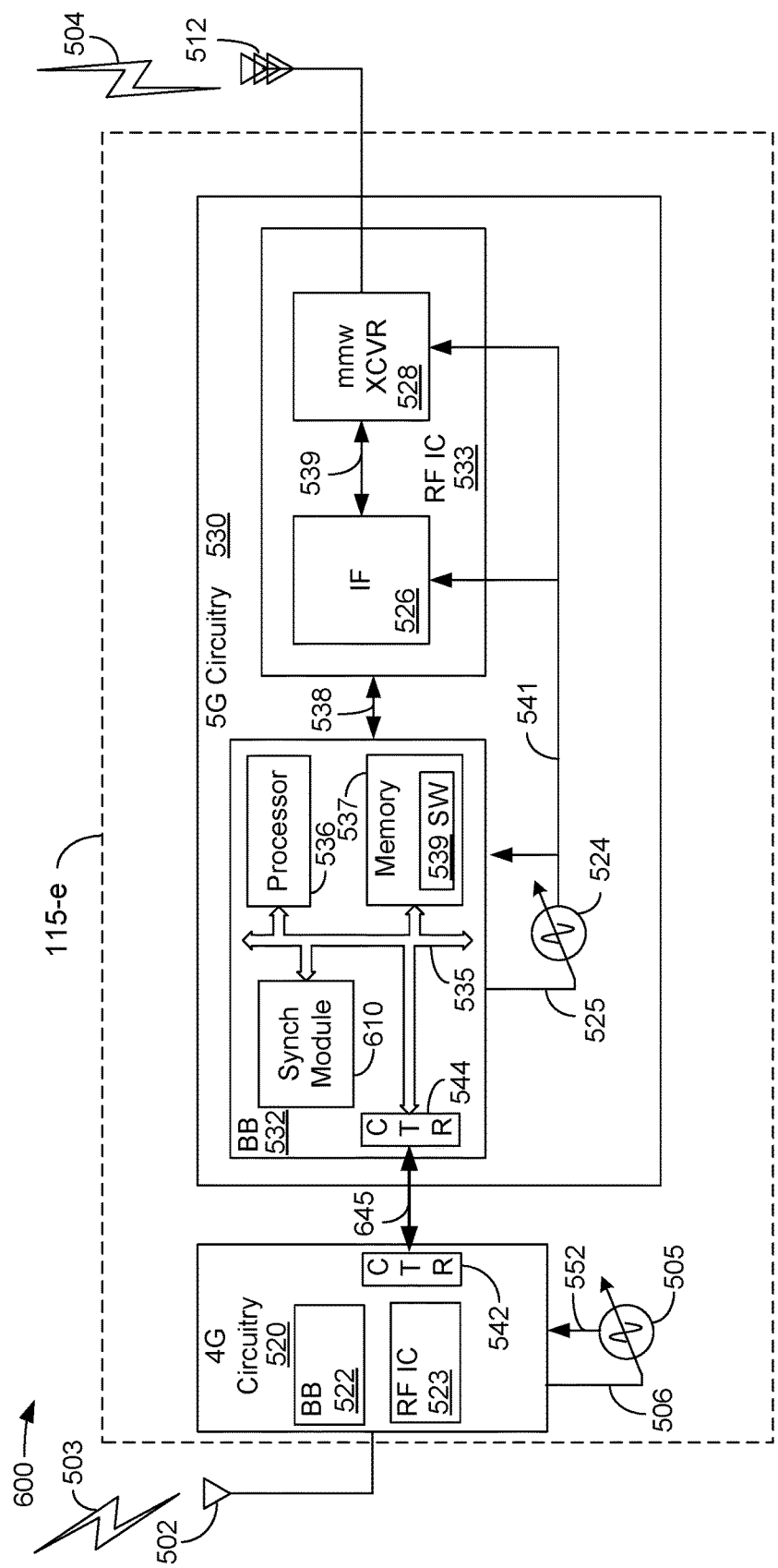
FIG. 6 is a block diagram showing a wireless communication system, in accordance with various aspects of the present disclosure.

FIG. 6 shows a system 600 for use in wireless communication, in accordance with various examples. The system 600 may be similar to the system 500 and may include a device 115-e, which may be an example of the UE 115 of FIG. 1. The device 115-e may also be an example of one or more aspects of devices 115 of FIGS. 2, 3, 4 and/or 5. The device 115-e may be similar to the device 115-d and elements in FIG. 6 that are identical to elements in FIG. 5 are not described again in detail.

The device 115-e may include a synchronization module 610, which may perform the functions described above for the synchronization module 210 of devices 115 of FIGS. 2, 3, 4 and/or 5.

In an exemplary embodiment, the 4G circuitry 520 and the 5G circuitry 530 may be coupled to a PCI-E bus 645. When it is desirable for the device 115-e to establish a 5G communication channel 504 with the base station (not shown) in addition to the 4G communication channel 503, the time duration for establishing the proper timing synchronization for a 5G communication channel 504 may be reduced by using the output of the 4G VCO 505 as a first timing synchronization parameter in this exemplary embodiment, to set an initial frequency of the 5G VCO 524.

In an exemplary embodiment, the baseband system 522, via the counter 542 in the 4G circuitry 520, counts the radio frames present in a defined period of time based on the frequency of the VCO 505, which is synchronized on the 4G network. The baseband system 522 stores the number of frames in the counter 542.

The baseband system 532 in the 5G circuitry 530 also counts the radio frames present in one defined period of time, based on the frequency of the VCO 524, and stores the number of radio frames in the counter 544. The processor 536 in the baseband system 532 compares the number of radio frames in the counter 542 with the number of radio frames in the counter 544 and uses the result to calculate a frequency offset between the VCO 505 in the 4G circuitry 520 and the VCO 524 in the 5G circuitry 530. The baseband system 532 then uses the frequency offset to develop a control signal over connection 525 to adjust the VCO 524 to synchronize the VCO 524 to the 4G VCO 505. Alternatively, a digital numerically controlled oscillator (DNCO) may be incorporated into the baseband system 532 to generate the control signal.

Figure 7:
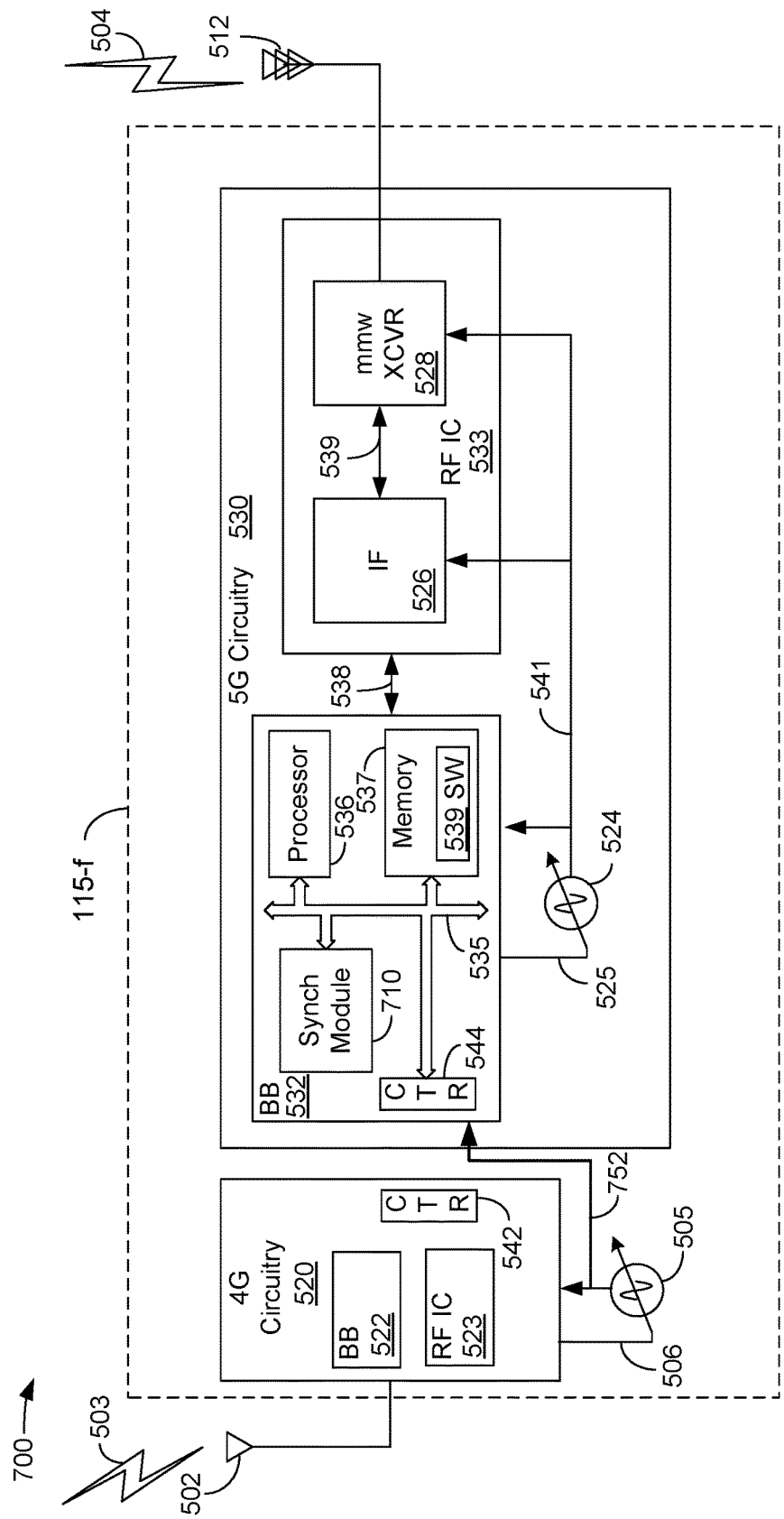
FIG. 7 is a block diagram showing a wireless communication system, in accordance with various aspects of the present disclosure.

FIG. 7 shows a system 700 for use in wireless communication, in accordance with various examples. The system 700 may be similar to the system 500 and may include a device 115-f, which may be an example of the UE 115 of FIG. 1. The device 115-f may also be an example of one or more aspects of devices 115 of FIGS. 2, 3, 4, 5 and/or 6. The device 115-f may be similar to the device 115-d and elements in FIG. 7 that are identical to elements in FIG. 5 are not described again in detail.

The device 115-f may include a synchronization module 710, which may perform the functions described above for the synchronization module 210 of devices 115 of FIGS. 2, 3, 4, 5 and/or 6.

In an exemplary embodiment, the output of the VCO 505 in the 4G circuitry 520 may be provided to the baseband system 532 over connection 752 as a first timing synchronization parameter, in this exemplary embodiment. The signal on connection 752 may be used to generate a control signal on connection 525 that can set the operating parameters of the VCO 524 in the 5G circuitry 530 to match the operating parameters of the VCO 505 in the 4G circuitry 520. For example, there can be a known relation between the values of the VCO 505 in the 4G circuitry 520 and the values of the VCO 524 in the 5G circuitry 530, so knowing the values of one could determine the values of the other. In this manner, the operating parameters of the VCO 505 in the 4G circuitry 520 are provided to the 5G circuitry 530 as a robust starting point for synchronizing the VCO 524 in the 5G circuitry 530 to enable the faster establishment of a 5G communication channel 504.

Figure 8:
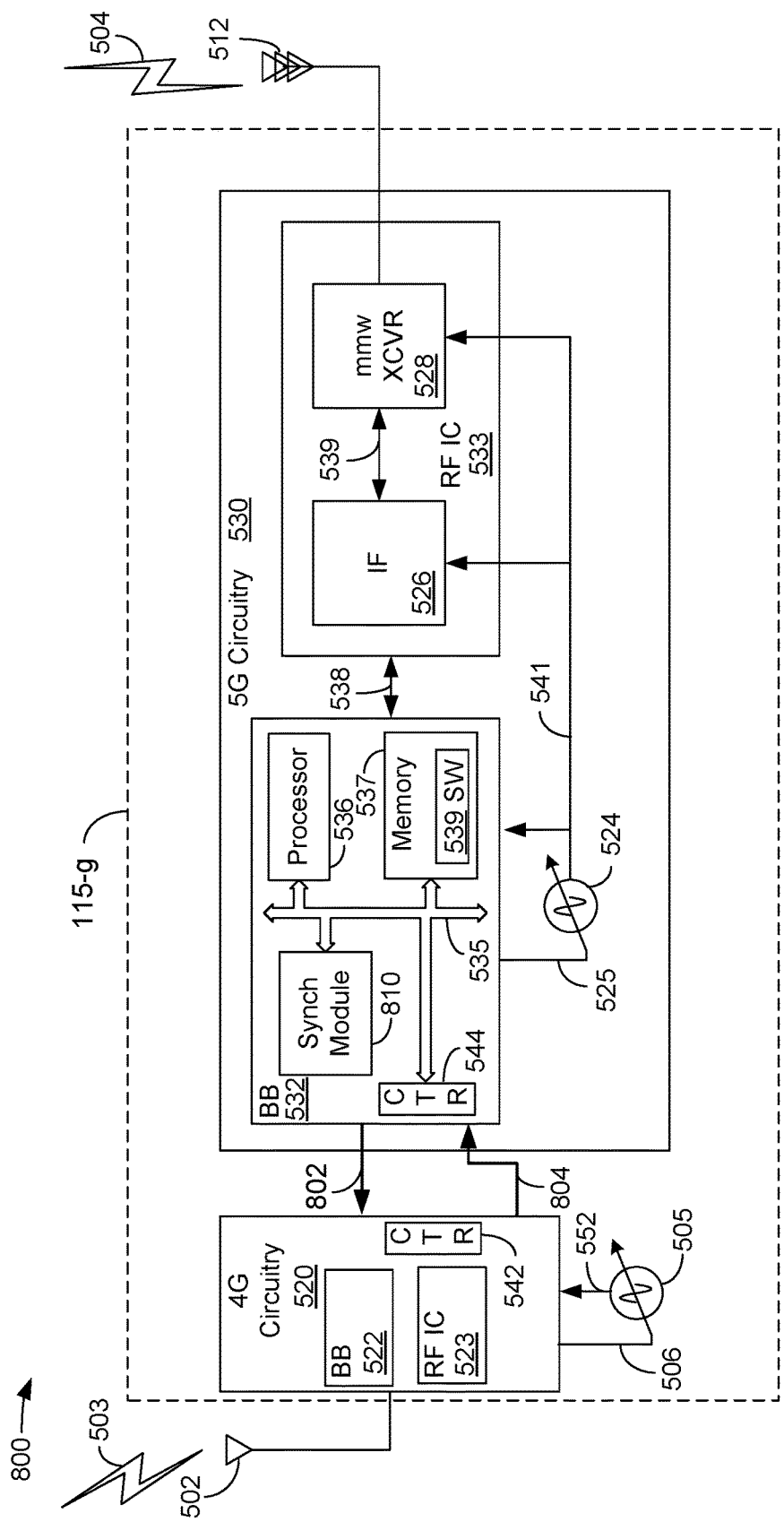
FIG. 8 is a block diagram showing a wireless communication system, in accordance with various aspects of the present disclosure.

FIG. 8 shows a system 800 for use in wireless communication, in accordance with various examples. The system 800 may be similar to the system 500 and may include a device 115-g, which may be an example of the UE 115 of FIG. 1. The device 115-g may also be an example of one or more aspects of devices 115 of FIGS. 2, 3, 4, 5, 6 and/or 7. The device 115-g may be similar to the device 115-d and elements in FIG. 8 that are identical to elements in FIG. 5 are not described again in detail.

The device 115-g may include a synchronization module 810, which may perform the functions described above for the synchronization module 210 of devices 115 of FIGS. 2, 3, 4, 5, 6 and/or 7.

In an exemplary embodiment, the output of the VCO 524 in the 5G circuitry 530 may be provided to the 4G circuitry 520 over connection 802 as a first timing synchronization parameter, in this exemplary embodiment. In an exemplary embodiment, the baseband system 522, via the counter 542 in the 4G circuitry 520, counts the frequency of the VCO 505, and stores the frequency in the counter 542. The 4G circuitry 520 compares the frequency of the VCO 524 against the frequency of the VCO 505 and uses the result of the comparison to calculate a frequency offset between the VCO 505 in the 4G circuitry 520 and the VCO 524 in the 5G circuitry 530. The 4G circuitry 520 then uses the frequency offset to develop a control signal, which is provided to the 5G circuitry 530 over connection 804. The 5G circuitry 530 then develops a 5G control signal based on the control signal from the 4G circuitry provided over connection 804 and provides the 5G control signal to the VCO 524 over connection 525 to adjust the VCO 524. Alternatively, a digital numerically controlled oscillator (DNCO) may be incorporated into the baseband system 532 to generate the 5G control signal.

Figure 9:
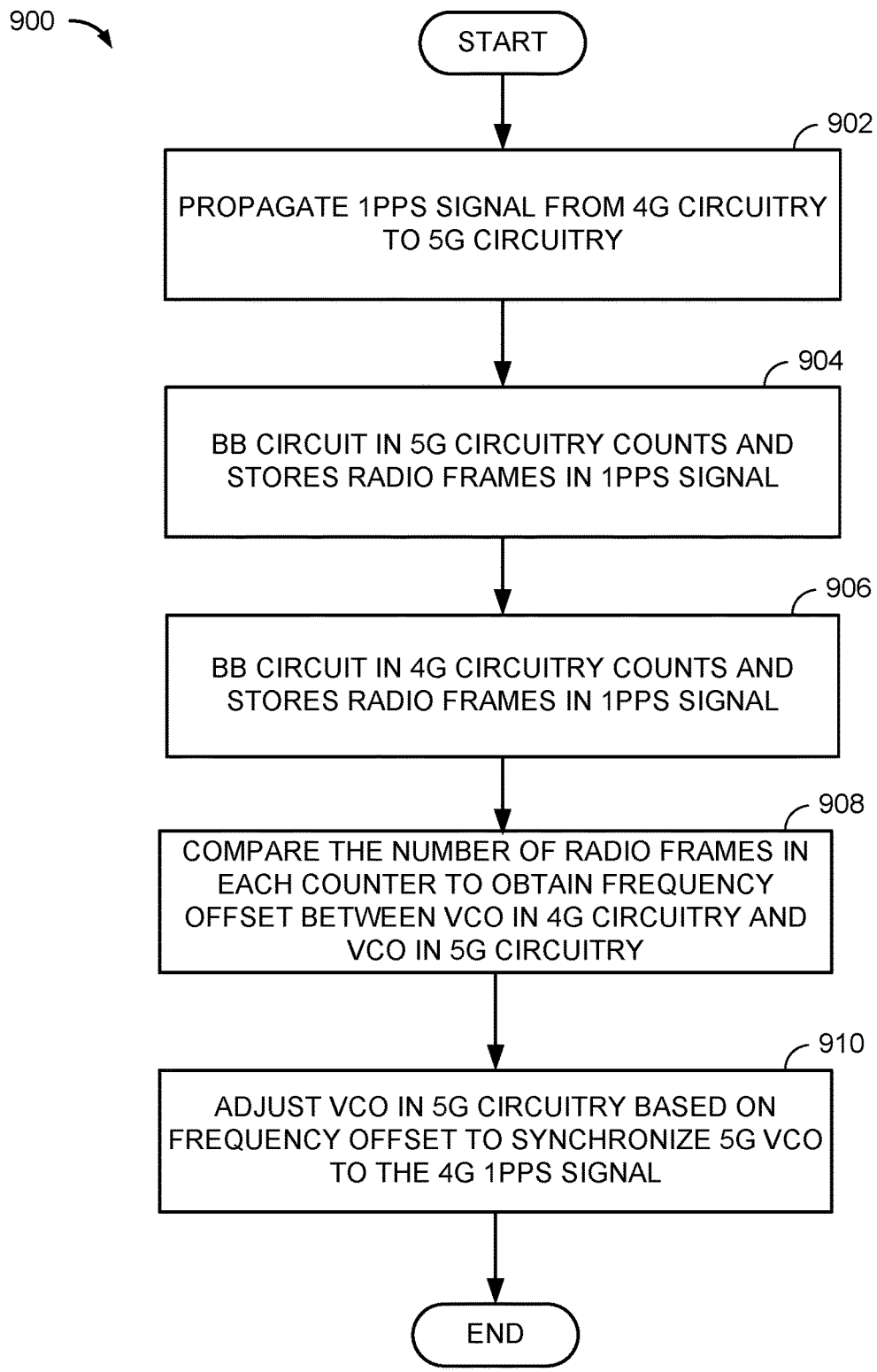
FIG. 9 is a flow chart illustrating an example of a method for communication, in accordance with various aspects of the present disclosure.

FIG. 9 is a flow chart illustrating an example of a method 900 for communication, in accordance with various aspects of the present disclosure. The blocks in the method 900 can be performed in or out of the order shown, and in some embodiments, can be performed at least in part in parallel.

In block 902 a 1 PPS signal, which in this exemplary embodiment is a first timing synchronization parameter, is propagated from first communication circuitry, such as 4G communication circuitry 520, to second communication circuitry, such as 5G communication circuitry 530.

In block 904, the baseband system 532 (FIGS. 5-8) in the 5G circuitry 530 counts a number of radio frames that may occur in the time period of the 1 PPS signal based on the frequency of the VCO 524 and stores the number of radio frames in the counter 544.

In block 906, the baseband system 522 (FIGS. 5-8) in the 4G circuitry 520 counts the radio frames present in the 1 PPS signal based on the frequency of the VCO 505 and stores the number of radio frames in the counter 542.

In block 908, the baseband system 532 compares the number of radio frames in the counter 542 with the number of radio frames in the counter 544 to determine a difference, and uses the result to calculate a frequency offset between the VCO 505 in the 4G circuitry 520 and the VCO 524 in the 5G circuitry 530.

In block 910, the baseband system 532 then uses the frequency offset to develop a control signal over connection 525 to adjust the VCO 524. Consequently, the baseband system 532 can synchronize the VCO 524 to the 4G 1 PPS signal.

Figure 10:
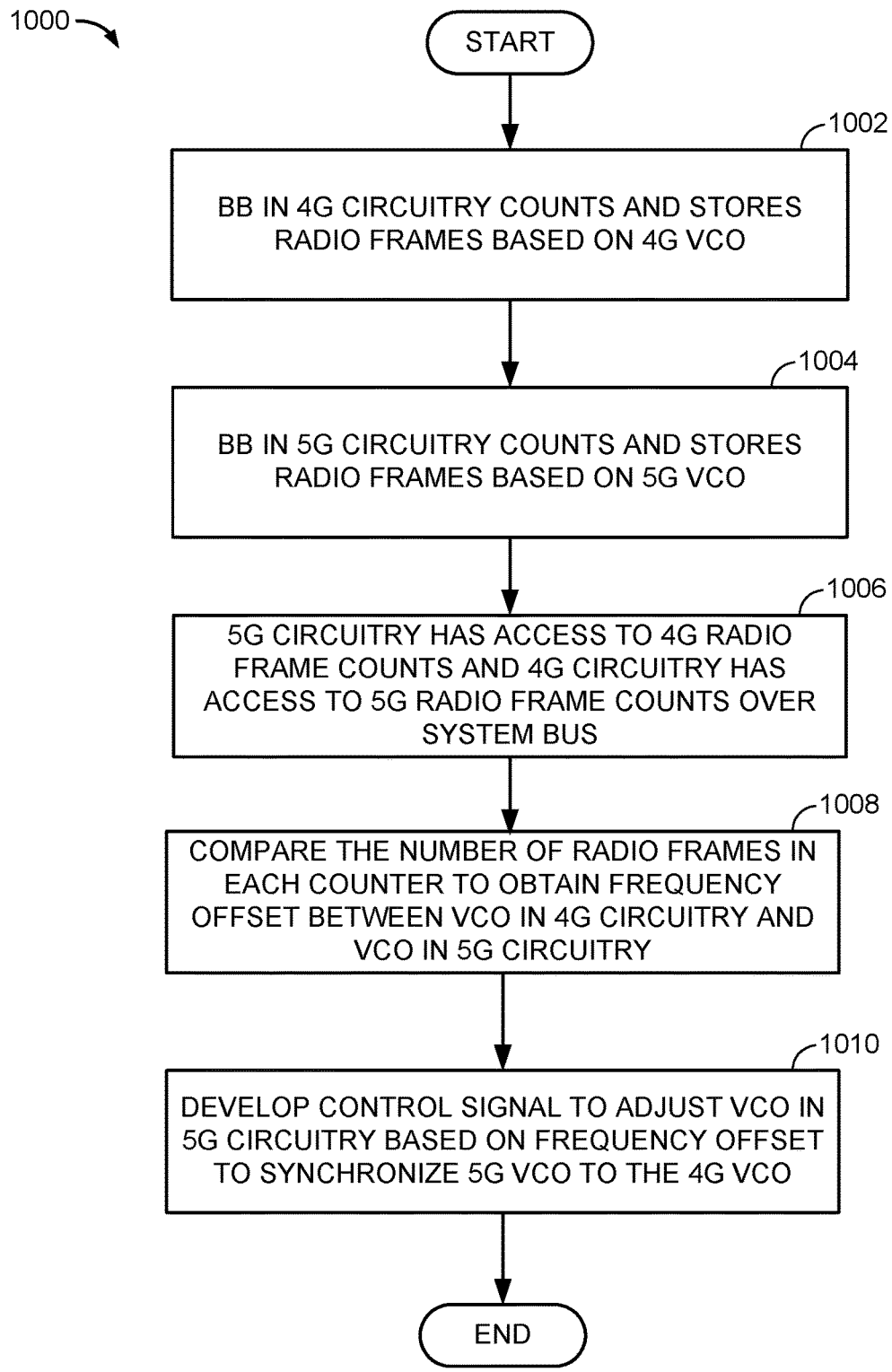
FIG. 10 is a flow chart illustrating an example of a method for communication, in accordance with various aspects of the present disclosure.

FIG. 10 is a flow chart illustrating an example of a method 1000 for communication, in accordance with various aspects of the present disclosure. The blocks in the method 1000 can be performed in or out of the order shown, and in some embodiments, can be performed at least in part in parallel.

In block 1002, the baseband system 522, via the counter 542 in the 4G circuitry 520, counts the radio frames present in a defined period of time based on the frequency of the VCO 505, and stores the number of frames.

In block 1004, the baseband system 532, via the counter 544 in the 5G circuitry 530, counts the radio frames present in one defined period of time, based on the frequency of the VCO 524 and stores the number of radio frames.

In block 1006, a communication bus, such as a PCI-E bus 645 (FIG. 6), allows the 4G circuitry 520 and the 5G circuitry 530 to communicate, and allows the information in the counters 542 and 544 to be accessible to both the 4G circuitry 520 and the 5G circuitry 530.

In block 1008, the baseband system 532 compares the number of radio frames in the counter 542 with the number of radio frames in the counter 544 to determine a difference, and uses the result to calculate a frequency offset between the VCO 505 in the 4G circuitry 520 and the VCO 524 in the 5G circuitry 530.

In block 1010, the baseband system 532 then uses the frequency offset to develop a control signal over connection 525 to adjust the VCO 524 to synchronize the 5G VCO 524 to the 4G VCO 505.

Figure 11:
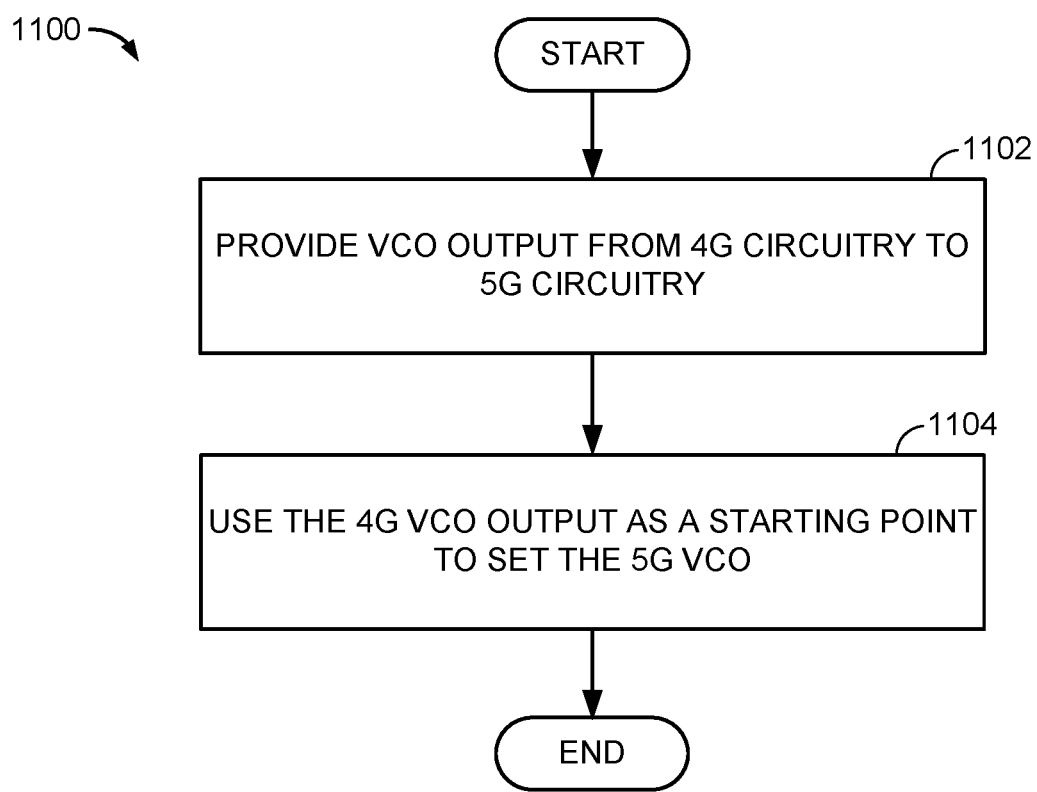
FIG. 11 is a flow chart illustrating an example of a method for communication, in accordance with various aspects of the present disclosure.

FIG. 11 is a flow chart illustrating an example of a method 1100 for communication, in accordance with various aspects of the present disclosure. The blocks in the method 1100 can be performed in or out of the order shown, and in some embodiments, can be performed at least in part in parallel.

In block 1102, the output of the 4G VCO 505 is provided to the baseband system 532 in the 5G circuitry 530.

In block 1104, the operating parameters of the VCO 524 in the 5G circuitry 530 can be set to match the operating parameters of the VCO 505 in the 4G circuitry 520. In this manner, the operating parameters, such as the operating frequency, of the VCO 505 in the 4G circuitry 520 are provided to the 5G circuitry 530 as a robust starting point, or basis, for synchronizing and setting the frequency of the VCO 524 in the 5G circuitry 530 to enable the establishment of a 5G communication channel 504.

Figure 12:
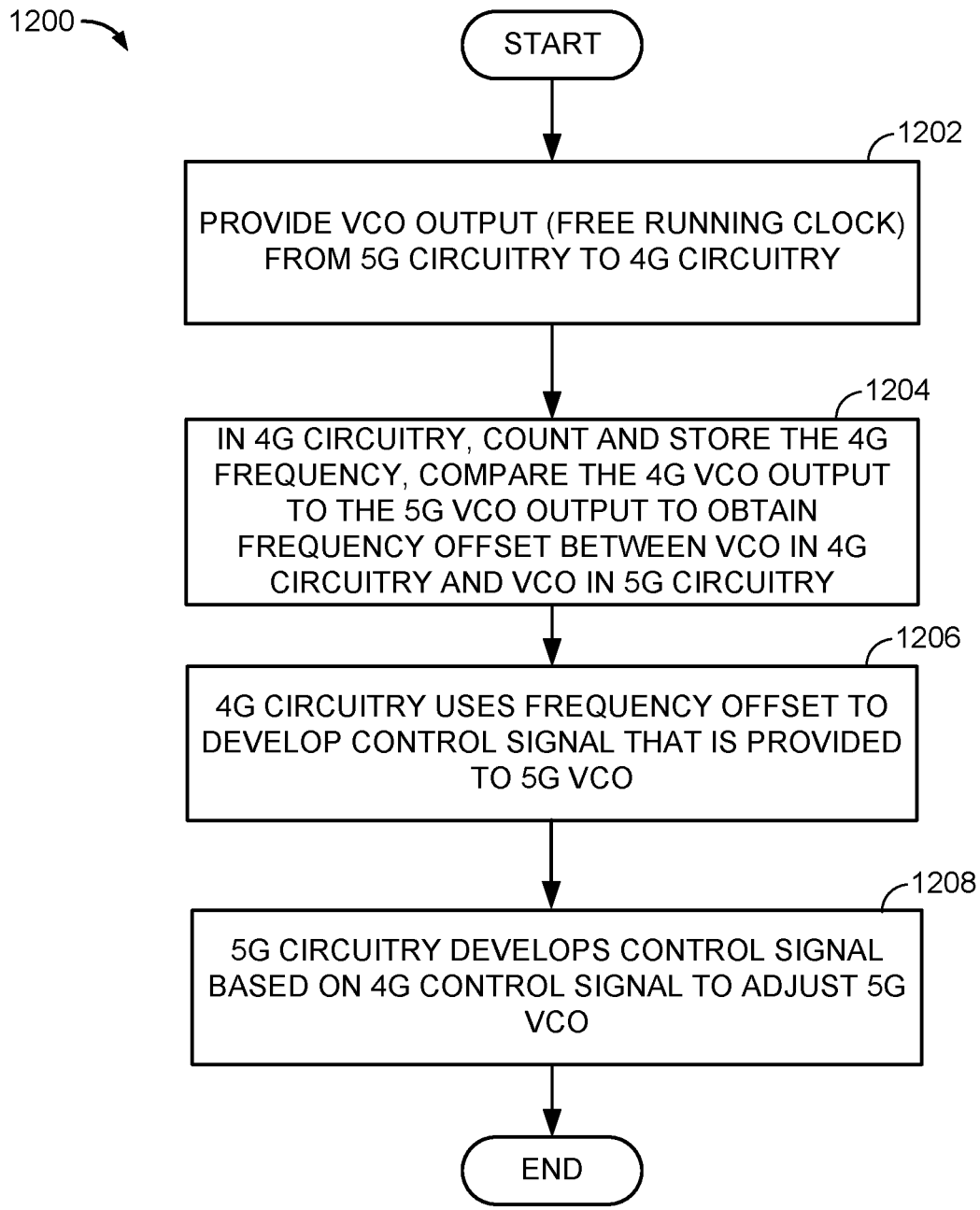
FIG. 12 is a flow chart illustrating an example of a method for communication, in accordance with various aspects of the present disclosure.

FIG. 12 is a flow chart illustrating an example of a method 1200 for communication, in accordance with various aspects of the present disclosure. The blocks in the method 1200 can be performed in or out of the order shown, and in some embodiments, can be performed at least in part in parallel.

In block 1202, the output of the VCO 524 in the 5G circuitry 530 may be provided to the 4G circuitry 520. In an exemplary embodiment, the output of the VCO 524 in the 5G circuitry 530 may be considered a "free running" clock.

In block 1204, the baseband system 522, via the counter 542 in the 4G circuitry 520, counts the frequency of the VCO 505, and stores the frequency in the counter 542. The 4G circuitry 520 compares the frequency of the VCO 524 against the frequency of the VCO 505 to determine a difference and uses the result of the comparison to calculate a frequency offset between the VCO 505 in the 4G circuitry 520 and the VCO 524 in the 5G circuitry 530.

In block 1206, the 4G circuitry 520 then uses the frequency offset to develop a control signal, which is provided to the 5G circuitry 530 over connection 804. In block 1208, the 5G circuitry 530 then develops a 5G control signal based on the control signal from the 4G circuitry provided over connection 804 and provides the 5G control signal to the VCO 524 over connection 525 to adjust the VCO 524.

Figure 13:
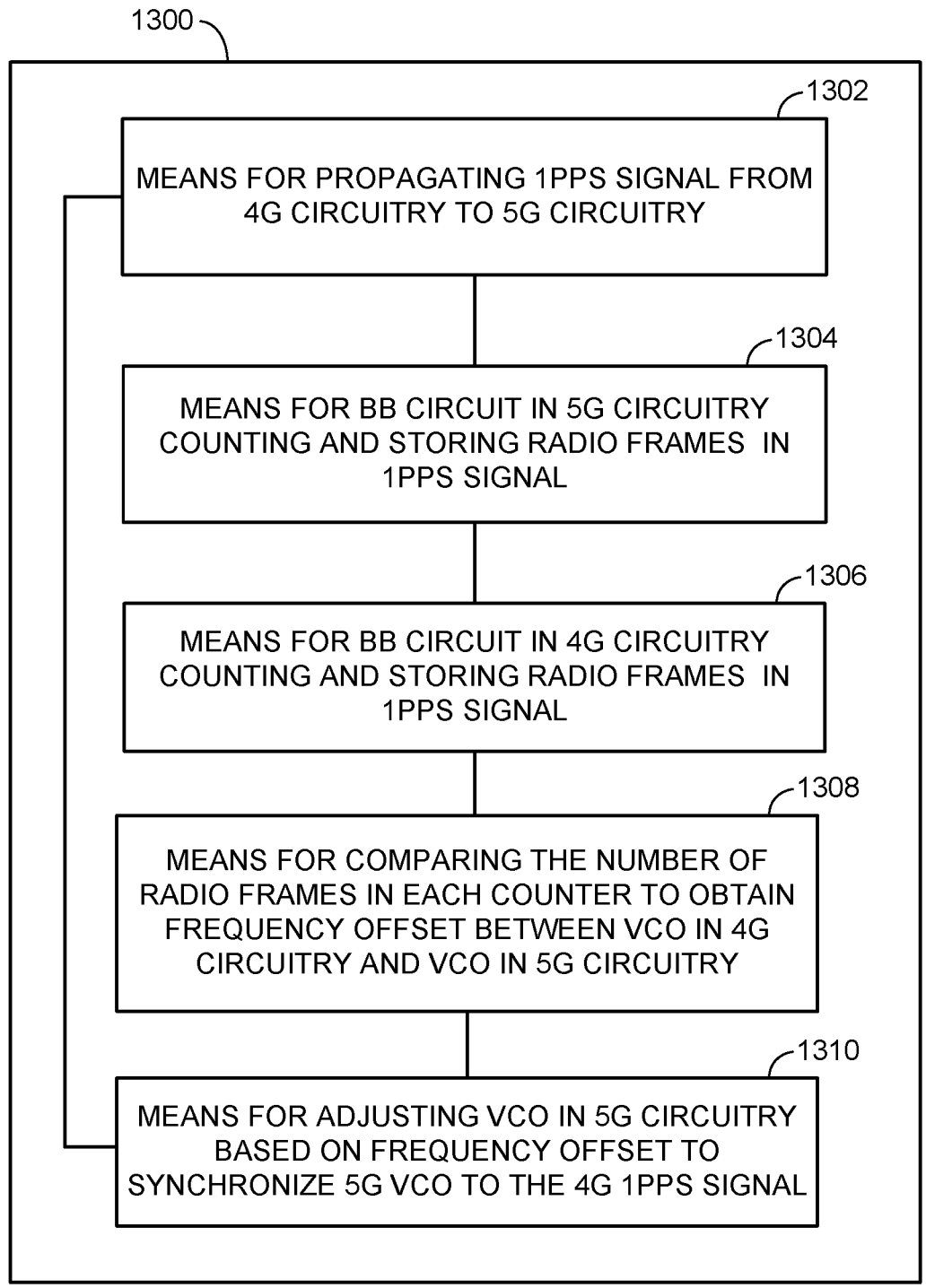
FIG. 13 is a functional block diagram of an apparatus for communication, in accordance with various aspects of the present disclosure.

FIG. 13 is a functional block diagram of an apparatus 1300 for communication, in accordance with various aspects of the present disclosure. The apparatus 1300 comprises means 1302 for propagating a 1 PPS signal, which in this exemplary embodiment is a first timing synchronization parameter, from first communication circuitry, such as 4G communication circuitry 520, to second communication circuitry, such as 5G communication circuitry 530. In certain embodiments, the means 1302 for propagating a 1 PPS signal from first communication circuitry to second communication circuitry can be configured to perform one or more of the function described in operation block 902 of method 900 (FIG. 9). In an exemplary embodiment, the means 1302 for propagating a 1 PPS signal from first communication circuitry to second communication circuitry may comprise propagating a 1 PPS signal from the 4G communication circuitry 520 to the 5G communication circuitry 530.

The apparatus 1300 further comprises means 1304 for counting a number of radio frames that may occur in the time period of the 1 PPS signal and storing the number of radio frames. In certain embodiments, the means 1304 for counting a number of radio frames that may occur in the time period of the 1 PPS signal and storing the number of radio frames can be configured to perform one or more of the function described in operation block 904 of method 900 (FIG. 9). In an exemplary embodiment, the means 1304 for counting a number of radio frames that may occur in the time period of the 1 PPS signal and storing the number of radio frames may comprise the baseband system 532 in the 5G circuitry 530 counting a number of radio frames that may occur in the time period of the 1 PPS signal based on the frequency of the VCO 524, and storing the number of radio frames in the counter 544.

The apparatus 1300 further comprises means 1306 for counting a number of radio frames that may occur in the time period of the 1 PPS signal and storing the number of radio frames. In certain embodiments, the means 1306 for counting a number of radio frames that may occur in the time period of the 1 PPS signal and storing the number of radio frames can be configured to perform one or more of the function described in operation block 906 of method 900 (FIG. 9). In an exemplary embodiment, the means 1306 for counting a number of radio frames that may occur in the time period of the 1 PPS signal and storing the number of radio frames may comprise the baseband system 522, via the counter 542 in the 4G circuitry 520, counting the radio frames present in the 1 PPS signal based on the frequency of the VCO 505 and storing the number of radio frames in the counter 542.

The apparatus 1300 further comprises means 1308 for comparing the number of radio frames in the counter 542 with the number of radio frames in the counter 544 to determine a difference, and calculating a frequency offset. In certain embodiments, the means 1308 for comparing the number of radio frames in the counter 542 with the number of radio frames in the counter 544 to determine a difference, and calculating a frequency offset can be configured to perform one or more of the function described in operation block 908 of method 900 (FIG. 9). In an exemplary embodiment, the means 1308 for comparing the number of radio frames in the counter 542 with the number of radio frames in the counter 544 to determine a difference, and calculating a frequency offset may comprise comparing the number of radio frames in the counter 542 with the number of radio frames in the counter 544, and using the result to calculate a frequency offset between the VCO 505 in the 4G circuitry 520 and the VCO 524 in the 5G circuitry 530.

The apparatus 1300 further comprises means 1310 for using the frequency offset to develop a control signal to synchronize the 5G VCO to the 4G 1 PPS signal. In certain embodiments, the means 1310 for using the frequency offset to develop a control signal to synchronize the 5G VCO to the 4G 1 PPS signal can be configured to perform one or more of the function described in operation block 910 of method 900 (FIG. 9). In an exemplary embodiment, the means 1310 for using the frequency offset to develop a control signal to synchronize the 5G VCO to the 4G 1 PPS signal may comprise the baseband system 532 using the frequency offset to develop a control signal over connection 525 to adjust the VCO 524 to synchronize the VCO 524 to the 4G 1 PPS signal.

Figure 14:
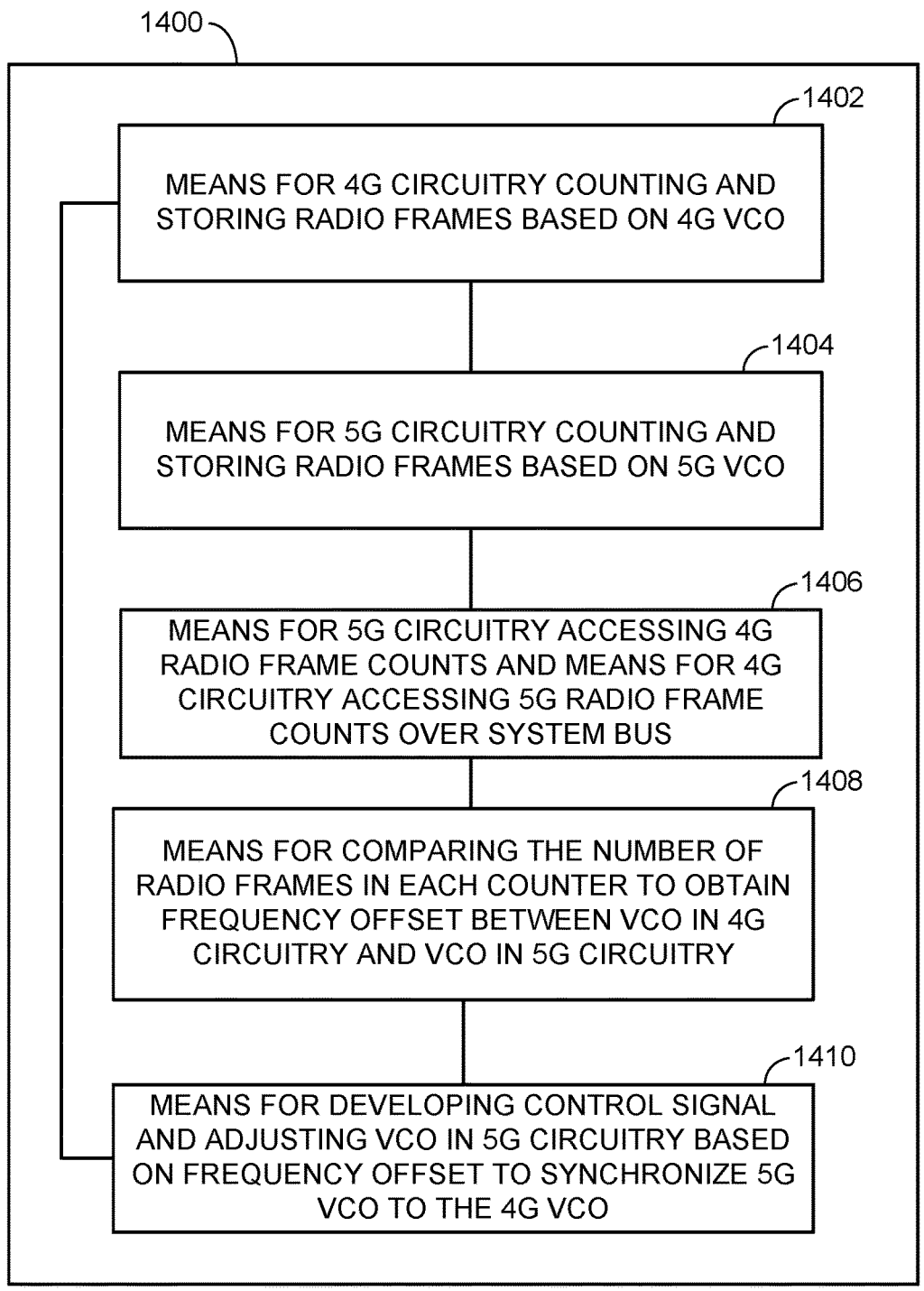
FIG. 14 is a functional block diagram of an apparatus for communication, in accordance with various aspects of the present disclosure.

FIG. 14 is a functional block diagram of an apparatus 1400 for communication, in accordance with various aspects of the present disclosure. The apparatus 1400 comprises means 1402 for counting a number of radio frames based on a 4G VCO and storing the number of radio frames. In certain embodiments, the means 1402 for counting a number of radio frames based on a 4G VCO and storing the number of radio frames can be configured to perform one or more of the function described in operation block 1002 of method 1000 (FIG. 10). In an exemplary embodiment, the means 1402 for counting a number of radio frames based on a 4G VCO and storing the number of radio frames may comprise the baseband system 522, via the counter 542 in the 4G circuitry 520, counting the radio frames present in a defined period of time based on the frequency of the VCO 505, and storing the number of frames in the counter 542.

The apparatus 1400 further comprises means 1404 for counting a number of radio frames based on a 5G VCO and storing the number of radio frames. In certain embodiments, the means 1404 for counting a number of radio frames based on a 5G VCO and storing the number of radio frames can be configured to perform one or more of the function described in operation block 1004 of method 1000 (FIG. 10). In an exemplary embodiment, the means 1404 for counting a number of radio frames based on a 5G VCO and storing the number of radio frames may comprise the baseband system 532, via the counter 544 in the 5G circuitry 530, counting the radio frames present in a defined period of time based on the frequency of the VCO 524, and storing the number of frames.

The apparatus 1400 further comprises means 1406 for the 5G circuitry accessing the 4G radio frame counts over a system bus. In certain embodiments, the means 1406 for the 5G circuitry accessing the 4G radio frame counts over a system bus can be configured to perform one or more of the function described in operation block 1006 of method 1000 (FIG. 10). In an exemplary embodiment, the means 1406 for the 5G circuitry accessing the 4G radio frame counts over a system bus may comprise the 4G circuitry 520 and the 5G circuitry 530 communicating over a communication bus, such as a PCI-E bus 645, and allowing the information in the counters 542 and 544 to be accessible to both the 4G circuitry 520 and the 5G circuitry 530.

The apparatus 1400 further comprises means 1408 for comparing the number of radio frames in the counter 542 with the number of radio frames in the counter 544 to determine a difference, and calculating a frequency offset. In certain embodiments, the means 1408 for comparing the number of radio frames in the counter 542 with the number of radio frames in the counter 544 to determine a difference, and calculating a frequency offset can be configured to perform one or more of the function described in operation block 1008 of method 1000 (FIG. 10). In an exemplary embodiment, the means 1408 for comparing the number of radio frames in the counter 542 with the number of radio frames in the counter 544 to determine a difference, and calculating a frequency offset may comprise comparing the number of radio frames in the counter 542 with the number of radio frames in the counter 544, and using the result to calculate a frequency offset between the VCO 505 in the 4G circuitry 520 and the VCO 524 in the 5G circuitry 530.

The apparatus 1400 further comprises means 1410 for using the frequency offset to develop a control signal to synchronize the 5G VCO to the 4G VCO. In certain embodiments, the means 1410 for using the frequency offset to develop a control signal to synchronize the 5G VCO to the 4G VCO can be configured to perform one or more of the function described in operation block 1010 of method 1000 (FIG. 10). In an exemplary embodiment, the means 1410 for using the frequency offset to develop a control signal to synchronize the 5G VCO to the 4G VCO may comprise the baseband system 532 using the frequency offset to develop a control signal over connection 525 to adjust the VCO 524 to synchronize the VCO 524 to the 4G VCO.

Figure 15:
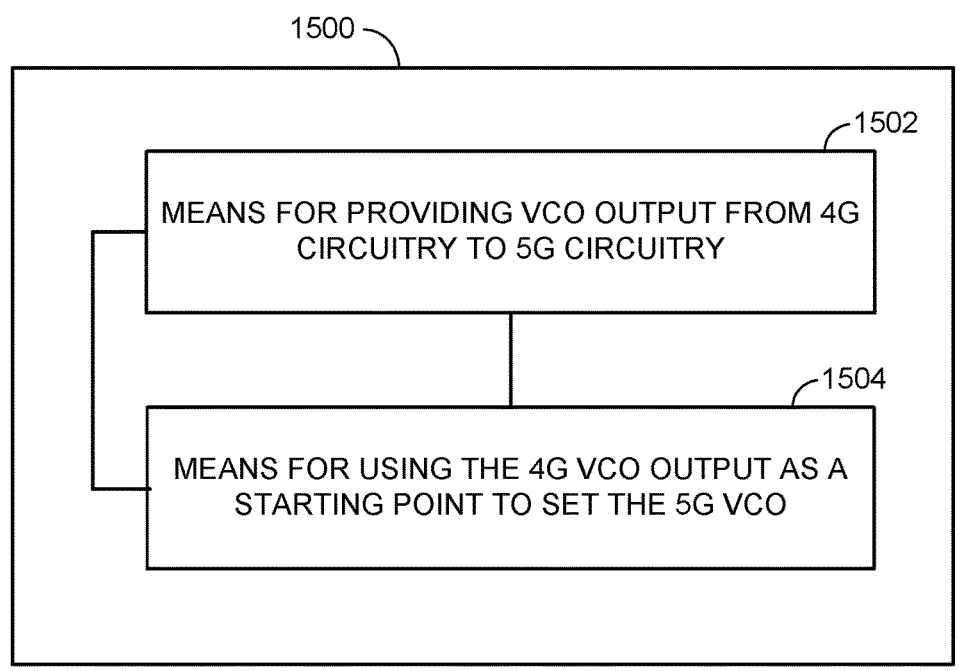
FIG. 15 is a functional block diagram of an apparatus for communication, in accordance with various aspects of the present disclosure.

FIG. 15 is a functional block diagram of an apparatus 1500 for communication, in accordance with various aspects of the present disclosure. The apparatus 1500 comprises means 1502 for providing the output of the 4G VCO to the baseband system in the 5G circuitry. In certain embodiments, the means 1502 for providing the output of the 4G VCO to the baseband system in the 5G circuitry can be configured to perform one or more of the function described in operation block 1102 of method 1100 (FIG. 11). In an exemplary embodiment, the means 1502 for providing the output of the 4G VCO to the baseband system in the 5G circuitry may comprise providing the output of the 4G VCO 505 to the baseband system 532 in the 5G circuitry 530.

The apparatus 1500 further comprises means 1504 for using the 4G VCO output as a starting point to set one or more parameters of the 5G VCO. In certain embodiments, the means 1504 for using the 4G VCO output as a starting point to set one or more parameters of the 5G VCO can be configured to perform one or more of the function described in operation block 1104 of method 1100 (FIG. 11). In an exemplary embodiment, the means 1504 for using the 4G VCO output as a starting point, to set one or more parameters of the 5G VCO may comprise setting one or more operating parameters, such as frequency, of the VCO 524 in the 5G circuitry 530 to match one or more operating parameters, such as frequency, of the VCO 505 in the 4G circuitry 520.

Figure 16:
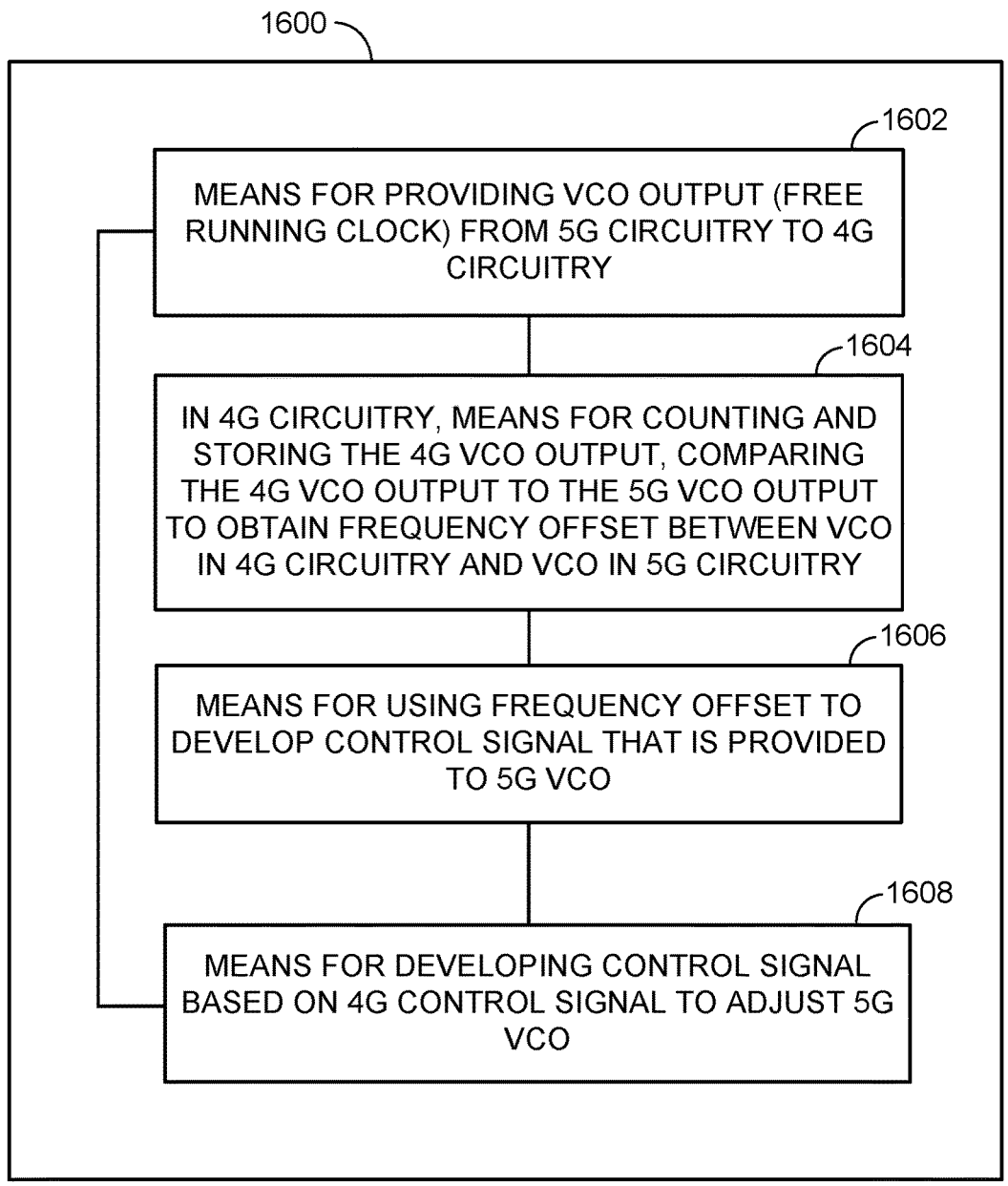
FIG. 16 is a functional block diagram of an apparatus for communication, in accordance with various aspects of the present disclosure.

FIG. 16 is a functional block diagram of an apparatus 1600 for communication, in accordance with various aspects of the present disclosure. The apparatus 1600 comprises means 1602 for providing the output of the VCO in the 5G circuitry to the 4G circuitry. In certain embodiments, the means 1602 for providing the output of the VCO in the 5G circuitry to the 4G circuitry can be configured to perform one or more of the function described in operation block 1202 of method 1200 (FIG. 12). In an exemplary embodiment, the means 1602 for providing the output of the VCO in the 5G circuitry to the 4G circuitry may comprise providing the output of the 4G VCO 505 to the baseband system 532 in the 5G circuitry 530. In an exemplary embodiment, the output of the VCO 524 in the 5G circuitry 530 may be considered a "free running" clock.

The apparatus 1600 further comprises means 1604 for counting and storing the 4G VCO output, comparing the 4G VCO output to the 5G VCO to determine a difference, and calculating a frequency offset between the VCO in the 4G circuitry and the VCO in the 5G circuitry. In certain embodiments, the means 1604 for counting and storing the 4G VCO output, comparing the 4G VCO output to the 5G VCO to determine a difference, and calculating a frequency offset between the VCO in the 4G circuitry and the VCO in the 5G circuitry can be configured to perform one or more of the function described in operation block 1204 of method 1200 (FIG. 12). In an exemplary embodiment, the means 1604 for counting and storing the 4G VCO output, comparing the 4G VCO output to the 5G VCO to determine a difference, and calculating a frequency offset between the VCO in the 4G circuitry and the VCO in the 5G circuitry may comprise the baseband system 522, via the counter 542 in the 4G circuitry 520, counting the frequency of the VCO 505, and storing the frequency in the counter 542. The 4G circuitry 520 compares the frequency of the VCO 524 against the frequency of the VCO 505 and uses the result of the comparison to calculate a frequency offset between the VCO 505 in the 4G circuitry 520 and the VCO 524 in the 5G circuitry 530.

The apparatus 1600 further comprises means 1606 for using the frequency offset to develop a control signal that is provided to the 5G VCO. In certain embodiments, the means 1606 for using the frequency offset to develop a control signal that is provided to the 5G VCO can be configured to perform one or more of the function described in operation block 1206 of method 1200 (FIG. 12). In an exemplary embodiment, the means 1606 for using the frequency offset to develop a control signal that is provided to the 5G VCO to the 4G VCO may comprise the 4G circuitry 520 using the frequency offset to develop a control signal, which is provided to the 5G circuitry 530 over connection 804.

The apparatus 1600 further comprises means 1608 for developing a control signal based on the 4G control signal to adjust the 5G VCO. In certain embodiments, the means 1608 for developing a control signal based on the 4G control signal to adjust the 5G VCO can be configured to perform one or more of the function described in operation block 1208 of method 1200 (FIG. 12). In an exemplary embodiment, the means 1608 for developing a control signal based on the 4G control signal to adjust the 5G VCO may comprise the 5G circuitry 530 developing a control signal based on the control signal from the 4G circuitry provided over connection 804 and providing it to the VCO 524 over connection 525 to adjust the VCO 524.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for clock synchronization in a communication system having first circuitry coupled to a first communication channel and second circuitry, the method comprising:
   generating a first timing synchronization parameter; and
   synchronizing the second circuitry to a second communication channel using the first timing synchronization parameter, wherein the first timing synchronization parameter comprises a second timing reference associated with the second communication channel, and the method further comprises:
      providing the second timing reference associated with the second communication channel to the first circuitry;
      comparing the second timing reference associated with the second communication channel against a first timing reference associated with the first communication channel;
      calculating a frequency offset based on a difference between the second timing reference and the first timing reference;
      developing a control signal based on the frequency offset; and
      using the control signal to adjust the second timing reference associated with the second communication channel.

2. The method of claim 1, wherein the first timing synchronization parameter comprises a first timing reference associated with the first communication channel, and the method further comprises:
   providing the first timing reference associated with the first communication channel to the second circuitry as a basis for establishing the second timing reference.

3. The method of claim 1, wherein the first circuitry comprises 4G communication circuitry and the second circuitry comprises 5G communication circuitry.

4. An apparatus for clock synchronization in a communication system, comprising:
   first circuitry coupled to a first communication channel;
   second circuitry; and
   a first timing synchronization parameter configured to allow the second circuitry to establish communication with a second communication channel, wherein the first timing synchronization parameter comprises a second timing reference associated with the second communication channel, and the apparatus further comprises:
      the second circuitry configured to provide the second timing reference associated with the second communication channel to the first circuitry;
      the first circuitry configured to compare the second timing reference associated with the second communication channel against a first timing reference associated with the first communication channel;
      the first circuitry configured to calculate a frequency offset based on a difference between the second timing reference and the first timing reference;
      the first circuitry configured to develop a control signal based on the frequency offset; and
      the second circuitry configured to use the control signal to adjust the second timing reference associated with the second communication channel.

5. The apparatus of claim 4, wherein the first circuitry comprises 4G communication circuitry and the second circuitry comprises 5G communication circuitry.

6. A device, comprising:
   means for coupling first circuitry to a first communication channel;
   means for generating a first timing synchronization parameter; and
   means for synchronizing second circuitry to a second communication channel using the first timing synchronization parameter, wherein the first timing synchronization parameter comprises a second timing reference associated with the second communication channel, and the device further comprises:
      means for providing the second timing reference associated with the second communication channel to the first circuitry;
      means for comparing the second timing reference associated with the second communication channel against a first timing reference associated with the first communication channel;
      means for calculating a frequency offset based on a difference between the second timing reference and the first timing reference;

means for developing a control signal based on the frequency offset; and means for using the control signal to adjust the second timing reference associated with the second communication channel.

7. The device of claim 6, wherein the first circuitry comprises 4G communication circuitry and the second circuitry comprises 5G communication circuitry.

8. A non-transitory computer-readable medium storing computer executable code for clock synchronization in a communication system having first circuitry coupled to a first communication channel and second circuitry, the code executable by a processor to:

generate a first timing synchronization parameter; and synchronize the second circuitry to a second communication channel using the first timing synchronization parameter, wherein the first timing synchronization parameter comprises a second timing reference associated with the second communication channel, and the code is executable by a processor to:

provide the second timing reference associated with the second communication channel to the first circuitry;

compare the second timing reference associated with the second communication channel against a first timing reference associated with the first communication channel;

calculate a frequency offset based on a difference between the second timing reference and the first timing reference;

develop a control signal based on the frequency offset; and use the control signal to adjust the second timing reference associated with the second communication channel.

9. The non-transitory computer-readable medium of claim 8, wherein the first circuitry comprises 4G communication circuitry and the second circuitry comprises 5G communication circuitry.

* * * * *